United States Patent [19]

Gerontopoulos et al.

[11] 3,993,578

[45] Nov. 23, 1976

[54] PROCESS FOR CONTROLLING THE GEOMETRICAL PROPERTIES OF PARTICLES OF CERAMIC MATERIALS

[75] Inventors: Panayotis Gerontopoulos; Carlo Fantuz, both of Leghorn, Italy

[73] Assignee: AGIP NUCLEARE, S.p.A., Milan, Italy

[22] Filed: Feb. 22, 1974

[21] Appl. No.: 444,773

[30] Foreign Application Priority Data

Feb. 23, 1973 Italy .................................. 20749/73

[52] U.S. Cl. .................... 252/301.1 R; 252/301.1 S; 264/.5; 264/5

[51] Int. Cl.[2] .............................................. G21C 3/54

[58] Field of Search ............... 252/301.1 S, 301.1 R; 264/.5, 5

[56] References Cited

UNITED STATES PATENTS

| | | | |
|---|---|---|---|
| 3,397,257 | 8/1968 | Brambilla et al. | 252/301.1 S |
| 3,586,742 | 6/1971 | Chin et al. | 264/.5 |
| 3,781,216 | 12/1973 | Hackstein et al. | 252/301.1 R |

OTHER PUBLICATIONS

Chem. Abstracts, 57:9233*h*.

*Primary Examiner*—Benjamin R. Padgett
*Assistant Examiner*—Deborah L. Kyle
*Attorney, Agent, or Firm*—Ralph M. Watson

[57] ABSTRACT

In the preparation of microspheres of nuclear fuel by feeding droplets of an aqueous solution of a salt of a metal constituting the nuclear fuel that is precipitated by a basic medium and a resin that increases in viscosity in the presence of an alkali into an aqueous alkaline solution so that spheroids are formed therefrom which are then dried and calcined, the geometrical properties of those spheroids are controlled by thermostating the feed solution so that the droplets which are fed into the alkaline solution have a predetermined temperature.

1 Claim, 1 Drawing Figure

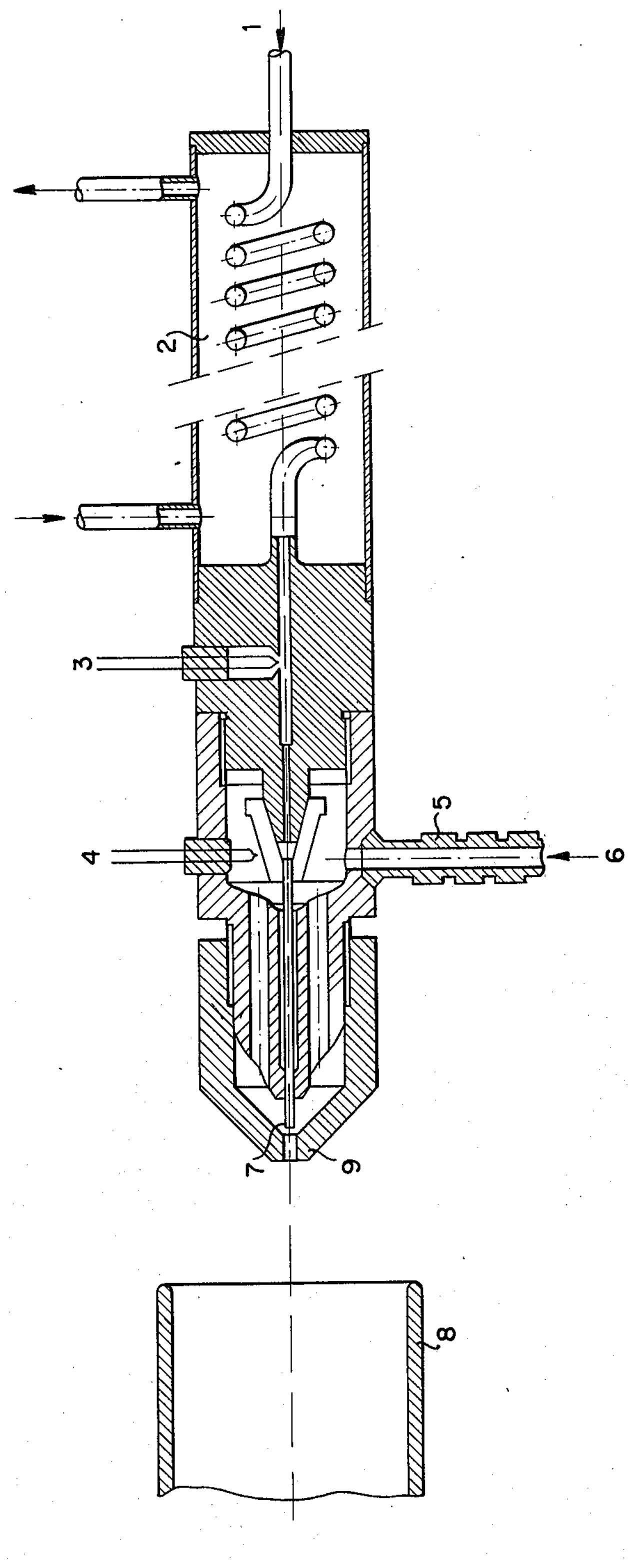
1
2
3
4
5
6
7
9
8

PROCESS FOR CONTROLLING THE GEOMETRICAL PROPERTIES OF PARTICLES OF CERAMIC MATERIALS

The present invention relates to a process for controlling the geometrical properties of particles of ceramic materials, said control being realized by means of the control of the viscosities of the feeding solutions that are used and by bringing said solutions to a particular temperature immediately before their dispersion as liquid particles.

The ceramic materials referred to above may be nuclear fuels, materials having special magnetic properties, catalysts and so on.

In two preceding Italian Pats. No. 727.301 of Snam S.p.A. and No. 778.786 of Snam Progetti S.p.A. (and the corresponding U.S. Pat. No. 3,397,257) has been claimed a process of preparation of spherical particles of ceramic materials, more particularly microspheres of nuclear fuel by making an aqueous solution of a salt of a metal constituting the nuclear fuel that is precipitated by a basic medium, admixing with said aqueous solution a water-soluble resin that increases in viscosity in the presence of an alkali, feeding the resultant solution in droplets into an aqueous alkaline solution so that regular spheroids are formed therefrom, and then drying and calcining those spheroids. Schematically said process consists in the preparation of an aqueous solution of the metal ions in question, thickened by the addition of polymeric compounds, and in some cases modified by water-soluble organic additives; in the formation of small drops by a suitable mechanical process as for example the dropping through a nozzle or a sprayer of suitable construction; in the transformation of the liquid drops into solid particles having a gelatinous nature, by precipitation of the metal ions contained therein in suitable chemical baths, for example alkalies; in the ageing, washing and drying; and, finally, in the calcination of the particles by means of suitable thermal treatments in a controlled atmosphere in order to obtain products of the desired chemical-physical properties.

The geometrical properties of the particles prepared by means of processes of the above-mentioned type are closely related to the values of viscosity and surface tension of the feed solutions used in the process.

Therefore it is important that said values, chosen empirically for a certain type of product, be maintained constant within suitable limits.

It is known that small variations of temperature also produce noticeable variations in the values of surface tension and in a more marked way in those of the viscosity of the same solutions.

Variations of the viscosity of the feed solutions caused by different factors, such as, for example, degradation of the thickeners used through the action of chemical agents and/or ionizing radiations, mistakes in weighing the thickener and so on may be easily compensated, within certain limits, by comparatively small variations of temperature in the feeding solution.

Furthermore, in certain cases, such as for example in the preparation of particles having diameters of the order of a micron, it may be desirable to operate with feed solutions having a particularly low viscosity in order to obtain a good capacity of the nozzles used combined with good properties of sphericity of the final product.

The subject of the present invention is a process for controlling the properties of viscosity of the feed solutions in processes of the above-mentioned type by controlling the temperature of the feed solutions. Said control, as may be seen, by way of example, from the scheme shown in the enclosed FIGURE, may be easily obtained by means of the thermostatic conditioning of a comparatively small volume of the feed solution, placed immediately upstream of the dripping nozzle.

In the following examples we refer to the apparatus illustrated in the FIGURE, shown by way of an unrestrictive example, but it will be appreciated that the same principle of control is valid for other types of nozzles for the formation of liquid drops such as, for example, mechanically vibrated nozzles, or spray nozzles of the type used in the burners of liquid fuel and so on.

The FIGURE shows a dripping apparatus having a termostatic nozzle.

Essentially, it is a standard dripping system modified, however, in order to allow the thermostating of a small volume of the feed solution upstream of the dripping device and the stripping air. Reference numeral 1 indicates the inlet of the feed solution; whereas 2 indicates the thermostatic liquid. The temperatures are measured by means of thermocouples of Ni-NiCr at the points indicated in the drawing, i.e. 3 indicates the thermocouple for measuring the temperature of the solution and 4 the thermocouple for measuring the temperature of the stripping air; 5 represents an electric resistance suitable for heating the stripping air, whereas 6 is the inlet of the stripping air. Reference numeral 7 indicates the needle forming part of the nozzle 9; 8 indicates the $NH_4OH$ solution.

The following examples are illustrative:

EXAMPLE 1

Preparation of particles of $UO_2$ having a final diameter of 800 microns. There was prepared a feed solution having the following chemical composition:

| | |
|---|---|
| $UO_2(NO_3)_2$ | 0.666 M |
| Methocel 90 HG-4000 | 0.75% |
| tetrohydrofurfurilic alcohol | 35% |
| free $HNO_3$ | 0.15 M |

The viscosity of this solution at a room temperature of 18° C was 280 centipoise. The solution was dripped into $NH_4OH$ by means of the dripping device shown in FIG. 1 and, by precipitation of uranium, there were obtained particles of ammonium diuranate having the shape of "tears".

The same solution was dripped in $NH_4OH$ after thermostating at the temperature of 32° C.

In this case, particles of good specific properties were obtained.

EXAMPLE 2

Preparation of particles of $UO_2$ of a final diameter of 20 microns. A solution having the same composition as the one reported in example 1 was sprayed, after thermostating at the temperature of 47° C, through a nozzle of the type illustrated in the FIGURE in order to obtain particles of ammonium diuranate which, converted in $UO_2$ after suitable thermal treatment, had a diameter of 20 microns.

We claim:

1. In a process of preparing microspherical particles of nuclear fuel which comprises making an aqueous solution of a salt of a metal constituting the nuclear fuel that is precipitated by a basic medium, admixing with said aqueous solution a water soluble resin that increases in viscosity in the presence of an alkali, dispersing the resultant solution into droplets and feeding said droplets as they are formed into an aqueous alkaline solution whereby spheroids are formed therefrom, and then drying and calcining the spheroids, wherein the improvement comprises controlling the geometrical properties of said particles by thermostating said resultant solution immediately before said dispersion into droplets so that the droplets which are fed into said aqueous alkaline solution have a predetermined temperature.

* * * * *